United States Patent [19]

Thompson

[11] Patent Number: 5,071,541
[45] Date of Patent: Dec. 10, 1991

[54] METHOD AND APPARATUS FOR SORTING A MIXTURE OF PARTICLES

[75] Inventor: R. Bruce Thompson, Havertown, Pa.

[73] Assignee: The Boeing Company, Seattle, Wash.

[21] Appl. No.: 252,483

[22] Filed: Sep. 30, 1988

[51] Int. Cl.⁵ .................... B07B 13/00; B24C 9/00
[52] U.S. Cl. ........................................ 209/2; 51/264; 51/320; 51/425; 209/12; 209/474; 209/477; 209/508
[58] Field of Search ............... 209/2, 3, 10, 12, 38–40, 209/466, 467, 471, 472, 474, 477, 485, 486, 508, 468, 469, 475, 476, 484, 502, 44; 51/263, 264, 292, 319–321, 424–427

[56] References Cited

U.S. PATENT DOCUMENTS

| | | | |
|---|---|---|---|
| 1,291,137 | 1/1919 | Reed | 209/474 |
| 2,717,694 | 9/1955 | Pansing et al. | |
| 2,853,192 | 9/1958 | Berry | 209/476 X |
| 3,102,092 | 8/1963 | Heath et al. | |
| 3,261,463 | 7/1966 | Eveson et al. | |
| 3,288,282 | 11/1966 | Eveson et al. | |
| 3,288,284 | 11/1966 | Manley | |
| 3,331,067 | 4/1967 | Smith et al. | 51/320 |
| 3,333,692 | 8/1967 | Eveson et al. | |
| 3,341,015 | 9/1967 | Eveson et al. | |
| 3,460,296 | 8/1969 | Dittmar | 51/320 |
| 3,774,759 | 11/1973 | Weintraub et al. | |
| 3,905,556 | 9/1975 | Drage | 209/44 X |
| 4,033,863 | 7/1977 | Stone | |
| 4,248,702 | 2/1981 | Wallace et al. | |
| 4,363,722 | 12/1982 | Dresty, Jr. et al. | 209/44 X |
| 4,646,480 | 3/1987 | Williams | 51/424 |
| 4,671,867 | 6/1987 | Battie et al. | 209/40 X |
| 4,741,443 | 5/1988 | Hanrot et al. | 209/467 X |
| 4,773,189 | 9/1988 | MacMillan et al. | 51/425 |
| 4,943,368 | 7/1990 | Gilbert et al. | 209/2 |

FOREIGN PATENT DOCUMENTS

| | | | |
|---|---|---|---|
| 0187730 | 7/1986 | European Pat. Off. | 209/467 |
| 2625426 | 12/1977 | Fed. Rep. of Germany | 51/425 |
| 3408828 | 9/1985 | Fed. Rep. of Germany | 51/320 |
| 3517309 | 11/1986 | Fed. Rep. of Germany | 209/486 |
| 1080713 | 12/1954 | France | 209/466 |
| 0758775 | 10/1956 | United Kingdom | 209/468 |
| 1370801 | 10/1974 | United Kingdom | 209/474 |

OTHER PUBLICATIONS

SAE Technical Paper Series 850713 "Abrasive Blast Cleaning—A Viable Alternative to Chemical Stripping Operations" by Joe Gardner of Clemco Industries, Feb. 1985.

Primary Examiner—Michael S. Huppert
Assistant Examiner—Edward M. Wacyra
Attorney, Agent, or Firm—Jones, Tullar & Cooper

[57] ABSTRACT

A method and apparatus for sorting a mixture of particles containing a first group of particles of substantially uniform size and density and a second group of particles of substantially the same size as the particles of the first group and of different density than the particles of the first group. The noted mixture is supplied to a reservoir in which it is fluidized so that the particles gather into different levels in accordance with their density. The particles are then removed from the reservoir at their different levels.

19 Claims, 2 Drawing Sheets

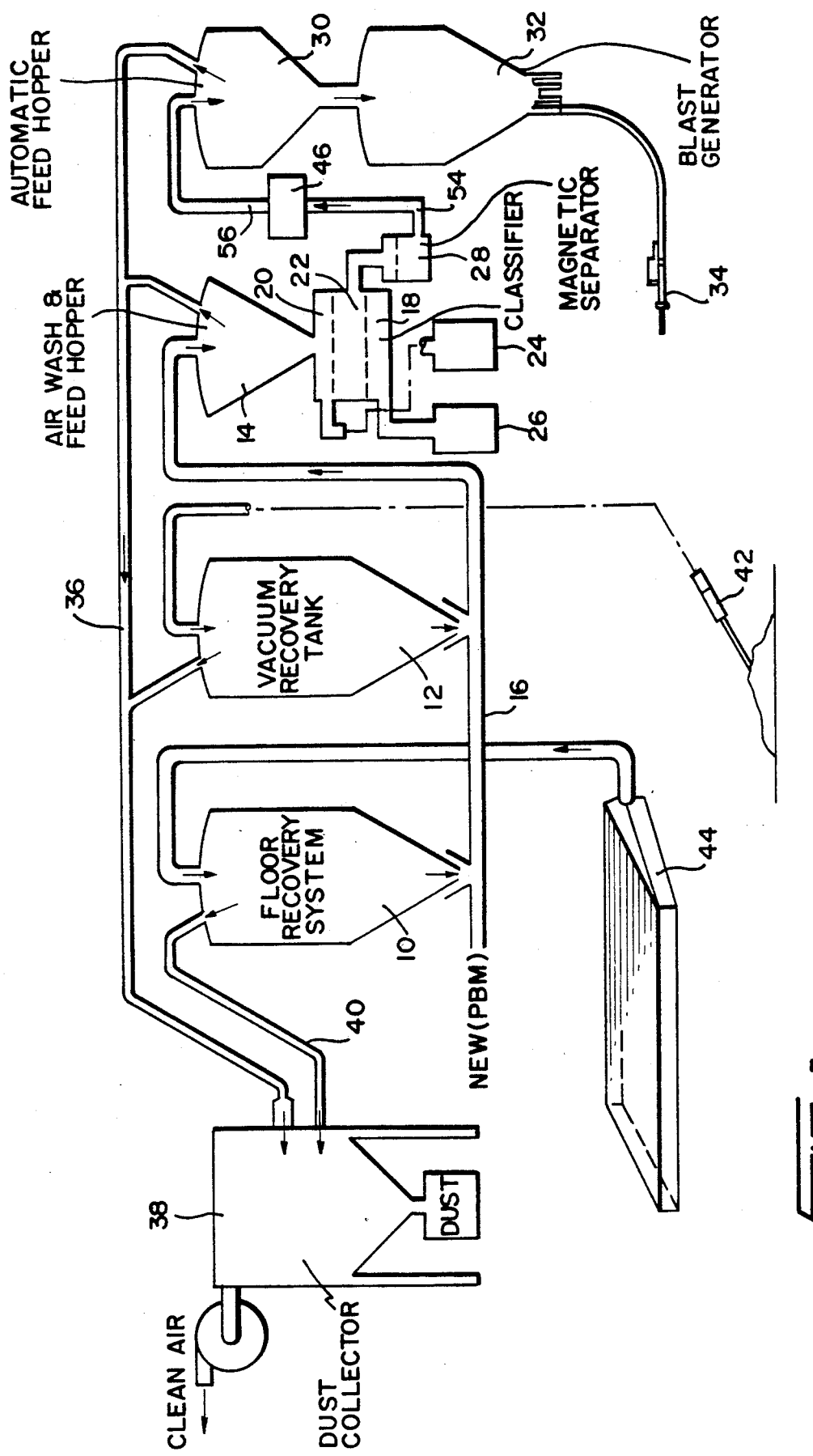

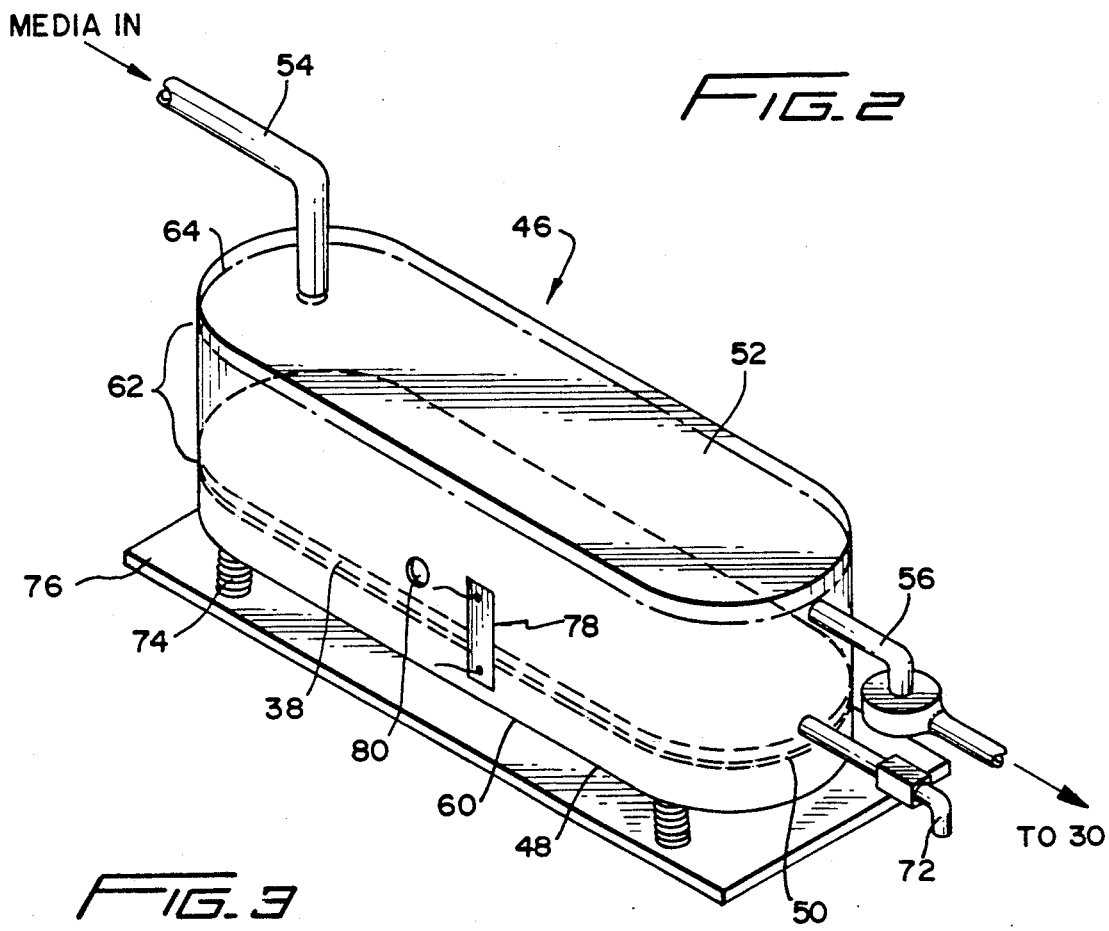
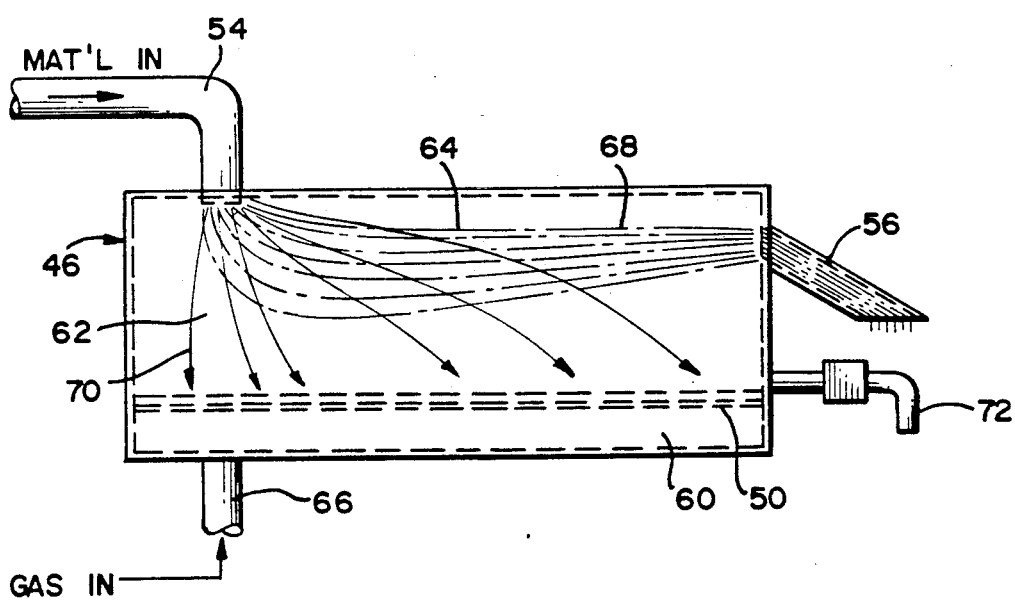

METHOD AND APPARATUS FOR SORTING A MIXTURE OF PARTICLES

TECHNICAL FIELD

The subject matter of this invention relates to the field of particle sorting or separation.

The particles are part of a mixture containing a first group of particles of substantially the same size and density and a second group of particles of the same size as the particles of the first group but of different density than the particles of the first group.

Such a mixture occurs, for example, when plastic blasting media (PBM) used for stripping of paint from a surface (substrate) becomes contaminated by the introduction of other substances such as metal chips, sand, glass, etc.

BACKGROUND OF THE INVENTION

In the aircraft industry the removal of paint from metal or composite substrates has always been a labor intensive effort. For many years chemical stripping has been the prevalent procedure. It is a time consuming and expensive procedure. In addition, one of the serious drawbacks associated with chemical stripping is the hazard to personnel and the environment due, for example, to the generation of toxic waste. A less hazardous, yet economical alternative has been sought in the aircraft industry.

Some alternatives to chemical stripping for paint removal have been proposed, known as mechanical paint removal procedures, such as laser, flash lamp, high pressure $CO_2$ and high pressure water knives. These procedures are not entirely acceptable however because of the substrate damage which frequently occurs.

One further alternative which is gaining wide acceptance is low pressure abrasive blast cleaning utilizing plastic abrasives. A brief discussion of this alternative can be found in the SAE Technical Paper Series No. 850713 given at the 21st annual Airline Plating and Metal Finishing Forum in Atlanta Ga. on Feb. 18-21, 1985 by Mr. Joseph Gardner and entitled Abrasive Blast Cleaning-A Viable Alternative To Chemical Stripping Operations.

As with any procedure, one of the concerns with the use of any form of abrasive material is substrate damage. It is essential that aircraft surfaces being stripped of a coating such as paint, and in particular surfaces of parts which are subject to load, such as fatigue load, not be damaged in any way. For example, the introduction of a crack, even a microscopic crack, in a part subject to fatigue loading can result in rapid crack propagation under load leading to failure of the part.

For this reason, a plastic blasting media (PBM) has been proposed. (PBM) is a relatively soft material with sharp angular edges that are provided with excellent cutting qualities. The inherent softness of the material, on the other hand, avoids damage to the substrate.

A detailed description of a typical system shown in FIG. 1 is presented hereinafter.

The use of the system shown in FIG. 1 has proven to be advantageous from the standpoint of man hours saved. It has also proved effective because of the use of (PBM) in avoiding substrate damage.

The (PBM) in such a system is intended to be recycled, and the system shown in FIG. 1 provides for such recycling by separating the (PBM) from the debris generated during the blasting process. In has been found, however, that the present separation process is not entirely satisfactory. A residue of contamination, continues to exist, which can, with cumulative cycles of use, cause the substrate damage noted above.

An object of the present invention, therefore, is to provide a method and apparatus which can be used, in one application, in conjunction with the system shown in FIG. 1 for effectively separating the (PBM) from all debris resulting from a stripping process comprising one or more cycles.

SUMMARY OF THE INVENTION

The (PBM) must be free of contaminants to ensure that damage to the substrate to be treated (blasted) does not occur. As noted, recycled (PBM) used with the system shown in FIG. 1 is known to contain contaminants, even though such a system contains dust removing components, air wash, particle-size screening and magnetic material removing components. Material which is non-magetic and is of a like-size, but of different density than the (PBM) are not completely removed, and this material can damage a substrate.

This invention focuses on the effective removal of this form of contaminant, which together with the components provided in the system of FIG. 1, or their equivalent, will provide the desired purity of (PBM) for recycled use.

To achieve this purpose, the present invention employs a fluidized bed technique. The mixture of (PBM) and like size contaminants are supplied to a reservoir which is fluidized. The fluidization of the particles in the reservoir causes the (PBM) and contaminants to collect at different levels in the reservoir because of the different densities of the particles. The separated (PBM) is removed from the reservoir at its level, while the contaminants are removed from the reservoir at their levels(s).

The reservoir has a bottom wall, an inlet opening and an outlet opening, or simply an opened top. Co-extensive with and spaced from the bottom wall of the reservoir is a diffusion membrane which defines an air manifold or plenum with the bottom wall. A mixture of (PBM) and contaminants is supplied through the inlet opening, or opened top, and defines a bed which extends from the membrane toward the outlet opening, or opened top, of the reservoir. A positive gas flow is supplied into the manifold and passes through the membrane and bed and is exhausted through the outlet opening or opened top. The mixture comprising the bed is thus fluidized and consequently forms the particle levels noted above, which are subsequently removed from the reservoir.

The fluidized bed device of the present invention is readily built and operated. It is easily scaled to any size, requires minimal monitoring, can be utilized as an in-line system to process material without interrupting or slowing production of the main blasting system (FIG. 1, for example).

The invention can successfully remove contaminants of both higher and lower densities than the recovered and recycled media being used.

With the present invention, (PBM) can be continuously reused, losing only that (PBM) which is broken or worn below minimum size limits without periodic purging and replacement. The expense or replacement and- /or rework of component damage by contaminants is also avoided.

The invention, while used with the system of FIG. 1, is useable in any other system requiring similar separation.

BRIEF DESCRIPTION OF THE DRAWINGS

FIG. 1 is a schematic view of an existing (PBM) system, modified by the addition of a reservoir or chamber according to the present invention.

For use with the system of FIG. 1, or with any other system requiring similar separation, the present invention contemplates the structure shown in FIGS. 2 and 3. While FIGS. 2 and 3 are schematic, they are believed to be sufficiently enabling to those skilled in the art to practice the invention. More specifically:

FIG. 2, is a perspective schematic view of an embodiment of the apparatus according to the present invention showing the essential components to produce a fluidized bed comprising particle levels of different density; and FIG. 3, is a schematic elevation view of the reservoir of an embodiment of the apparatus according to the present invention illustrating the flow paths of the mixture in the reservoir.

DETAILED DESCRIPTION

As noted above, the system shown in FIG. 1 is an existing system. It uses (PBM) which can be purchased from, for example, U.S. TECHNOLOGY Corporation. One type of (PBM) purchased from U.S. TECHNOLOGY Corporation is POLYPLUS which has the following physical characteristics identified by U.S. TECHNOLOGY Corporation.

| | |
|---|---|
| Hardness, Mohs Scale | 3.5 |
| Moisture Content | <0.1% |
| Specific Gravity | 1.5 |
| Bulk Density | 58-60 lbs/cu. ft. |
| Operational Temp. Range | 0° F. to 300° F. |
| Chemical Nature | self-extinguishing, hydrophobic, inert, non-biodegradable |
| Particle Shape | irregular, granular, with sharp angular edges |
| Sieve Size | 12-16, 16-20, 20-30, 30-40, 40-60, 60-80 |

New (PBM) as well as recycled (PBM) from tanks 10 and 12 is supplied to an air wash and feed hopper 14 by a manifold 16. The air wash represents the first separation step. From the hopper 14, the (PBM) is fed to a classifier 18 where further separation occurs. The classifier 18 includes a two-level screening system. The top screen 20 allows (PBM) of a given sieve size and all other particles of a similar or smaller sieve size to pass through to the bottom screen 22. The particles not passed by the screen 20 are delivered to a tank 24. At the bottom screen 22, all particles of a sieve size smaller than the given sieve size of the (PBM) are passed through and collected in a tank 26. The particles of the given sieve size, including the (PBM) are then passed through a magnetic separator 28 where the magnetic particles are removed and accumulated. The remaining particles of the given sieve size are delivered to an automatic feed hooper 30, and from there to a blast generator 32 to which one or more nozzles 34 are connected.

The tank 12 and the hoppers 14 and 30 are connected to a common manifold 36, which in turn is connected to a dust collector 38. The tank 10 is connected directly to the dust collector 38 by a connection 40.

The blasting procedure takes place, preferably, in an enclosed space so that the spent (PBM) and contaminates can accumulate on the floor of the enclosed space. The accumulated particles can be recovered and recycled by one or both of the following components: a hand vacuum recovery apparatus 42 connected to the tank 12; and a pneumatic floor recovery apparatus 44 connected to the tank 10.

The nozzles 34 operate at a relatively low pressure of approximately 25 to 40 psi for most applications with, for example, a media flow rate of 600 to 1200 lbs/hr. and a nozzle size of $\frac{1}{4}$ in. in diameter.

In an ideal situation, the system shown in FIG. 1 would have the capability of segregating all but the desired sieve size of (PBM). This, however, is not the case. In addition, the (PBM) itself has a finite life. It breaks down with continued use into fine non-reusable dust. All particles of the desired size which are not (PBM) are contaminates and should be removed. For these reasons, the fluidized bed technique structurally illustrated in FIGS. 2 and 3 was developed. The apparatus shown in FIGS. 2 and 3 may be connected in an in-line manner into the system of FIG. 1, for example, between the separator 28 and the hopper 30.

Referring to FIG. 2, the apparatus includes a reservoir or chamber 46 having a bottom wall 48 and preferably one side wall 50. As shown, the reservoir 46 has an open top end 52, although a top wall with an inlet opening may be provided. The reservoir 46 has an oval shape which is preferred as it provides the longest path from input to output for the fluidized particles, and for this purpose an inlet 54 and outlet 56 are provided and situated at the opposite ends of the major axis of the oval area defined by the open top end 52.

A diffusion membrane 58 having a corresponding oval shape is situated in the reservoir 46 and defines with the bottom wall 48 and side wall 50 a gas plenum or manifold 60. The diffusion membrane 58 can be ultra fine screen, industrial felt, a sintered porous material or porous ceramic. Actually any porous material that is homogenous in its flow characteristics and permits gas flow but not particle passage would suffice. The diffusion membrane 58 is preferably sealed in the reservoir 46 to the inside surface of the side wall 50 by any number of commercially available adhesives. Alternatively, the diffusion membrane 58 can be mounted in any other known fashion to the reservoir 46, by, example, a mechanical clamp ring, although a seal, such as an adhesive seal, between the membrane edge and the inside surface of the side wall 50 is preferred with any mounting.

The diffusion membrane 58 allows an even flow of gas, such as air, to be diffused over its entire surface, i.e., uniform flow-through of gas over its entire surface from the gas manifold 60 to the region of the reservoir 46 above the membrane (the mixture bed region). The location of the diffusion membrane 58 in the reservoir 46 is arbitrary and can be located as a function of the kind and amount of mixture material being handled and the gas pressures necessary.

A mixture of particles containing a first group of particles of substantially uniform size (sieve size) and density and a second group of particles of substantially the same size as the particles of the first group but of different density than the particles of the first group is delivered through the inlet 54 onto the surface of the fluidized particles in the reservoir 46. The mixture may originate from a system such as that of FIG. 1. In such a case, the mixture passes from the magnetic separator 28 through the inlet 54 to the reservoir 46. The mixture forms a bed 62 in the reservoir 46 which extends from the surface of the diffusion membrane 58 to a top operating level 64. The mixture bed 62 is fluidized by the gas passing through the diffusion membrane 58 from the manifold 60, i.e., the particles are suspended in the gas such that the particles can assume a flow pattern in accordance with their density. The gas, for example, air, is supplied to the manifold 60 through an inlet 66. Alternatively, a series of inlets 66 can be provided about the manifold 60. In either case, the gas pressure is adjusted so that the flow patterns noted can occur.

The process of delivering mixture to the reservoir 46 and pressurizing the manifold 60 may be carried on in a somewhat continuous manner, and as a consequence the mixture flows as shown in FIG. 3 with the dashed lines 68 showing the flow pattern of particles of one of the two groups of particles having the lighter density and the solid lines 70 showing the flow pattern of particles of the other group of particles having the higher density. The result is a fluidized bed of particles separated or sorted into levels in accordance with their densities. There may be as many levels as there are different densities. In its application with the system of FIG. 1 and (PBM) the lines 68 would represent the sorted (PBM), and the lines 70 would represent the sorted contaminants of higher density. The outlets 56 and 72 are provided for removing the sorted particles from the reservoir 46. There may be as many outlets as their are levels of particles, two being shown in FIGS. 2 and 3. The mixture feed and particle removal from the reservoir 46, is, as shown in FIGS. 2 and 3, achieved by gravity. Alternatively, a pressure or vacuum source (not shown) may be utilized. In addition, the inlet and various outlets may have appropriate valves provided to control flow.

According to the preferred embodiment, the reservoir 46 is mounted by springs 74 onto a platform 76. The spring mounting allows the reservoir 46 to deflect under the increasing weight of the mixture as the retained heavy contaminant's percentage increases. It is necessary to provide a method for assuring that the reservoir cannot deflect unevenly on its spring mounting, so a mechanism such as a Watts linkage may be provided if spring mounts are used. This provides the uniform depth of fluidized particles which is essential for proper operation. A Watts linkage is a known linkage and consequently is neither shown or described herein. In conjunction with this mounting, a bank of sensors 78 are mounted to the platform 76 and monitor the deflection of the reservoir 46 and consequently the increased weight associated with an increased percentage of heavy contaminants. The sensors can be wired into a central control (the control for FIG. 1, for example) which controls the flow of the mixture through the inlet 54 and the outlet 72 so as to periodically stop the incoming mixture and vent the accumulated contaminants of higher density.

An alternative method for assuring uniform depth while allowing detection of the increased weight which is indicative of increased levels of heavy particles is to mount the reservoir on load cells or sensors which detect increased weight without deflection.

A tuneable vibrator or vibrators 80 located approximately ⅔ below the top operating level 64 of the mixture bed 62 in the reservoir 46 are preferably provided to insure that excessive surging, channeling and the like is avoided in the fluidized bed which would disturb the noted flow.

There are two aspects of the present invention, a method and apparatus, employing a fluidized bed technique, according to which a mixture of particles of substantially uniform size but of differing densities can be separated into different levels of particles. In each level, the particles are of substantially uniform density.

It is found that as a result of the present invention, the separation of (PBM) from contaminants in a system such as that of FIG. 1 in which recycling of medium occurs, is possible to a high degree.

What is claimed is:

1. In a method of sorting particles including subjecting the particles to at least an air wash, screening and magnetic separation producing thereby a mixture comprising plastic blasting particles of a substantially uniform size and density and particles of substantially the same size and of a different density than the plastic blasting particles, the improvement comprising the steps of:
    supplying the mixture to a reservoir;
    pressurizing the reservoir such that the particles of the mixture collect at different levels in the reservoir in accordance with their density;
    removing the plastic blasting particles from their level in the reservoir; and
    removing the other particles from their levels in the reservoir separately from the plastic blasting particles.

2. In the method as defined in claim 1, wherein the mixture is supplied to the reservoir by gravity.

3. In the method as defined in claim 1, wherein the plastic blasting particles are removed from the reservoir by gravity.

4. In the method as defined in claim 1, the improvement further comprising the step of:
    vibrating the mixture in the pressurized reservoir to avoid surging, channeling and the like of the mixture as the particles collect at their defined levels.

5. In the method as defined in claim 4, wherein the vibrations are applied to the mixture near the bottom of the reservoir.

6. In the method as defined in claim 1, wherein the mixture is fluidized by the application of positive air flow to the reservoir.

7. In the method as defined in claim 1, further comprising the step of:
    maintaining the reservoir level thereby insuring a uniform depth of fluidized material.

8. An apparatus for separating a mixture containing a first group of particles of substantially uniform size and density and a second group of particles of substantially the same size as the particles of said first group, comprising:
    means defining a reservoir having a bottom wall, an inlet opening and an outlet opening;
    mounting means on which said means defining the reservoir is mounted permitting vertical displacement of said means defining the reservoir;
    level sensing means for sensing a given mixture contamination level as a result of displacement of said means defining the reservoir;
    a diffusion membrane coextensive with the bottom wall and spaced therefrom defining a gas manifold with the bottom wall;

mixture supply means for introducing the mixture through the inlet opening in said reservoir, said mixture defining in said reservoir a bed extending from the membrane toward the outlet opening of said reservoir;

means supplying a positive gas pressure into the manifold, said gas passing through the diffusion membrane and the mixture bed and exhausting through the outlet opening, said mixture being fluidized by said gas such that the first and second groups of particles collect at different levels in said bed in accordance with their density;

means for removing the groups of particles from the reservoir separately; and means for maintaining the reservoir level thereby insuring a uniform depth of fluidized mixture.

9. The apparatus as defined in claim 8, wherein said mounting means comprises.

10. An apparatus for separating a mixture containing plastic blasting particles of substantially uniform size and density and particles of substantially the same size and of a different density than the plastic blasting particles, comprising:

means defining a reservoir having a bottom wall and an opened top;

mounting means on which said means defining the reservoir is mounted permitting vertical displacement of said means defining the reservoir;

level sensing means for sensing a given mixture contamination level as a result of displacement of said means defining the reservoir;

a diffusion membrane coextensive with the bottom wall and spaced therefrom defining a gas manifold with the bottom wall;

mixture supply means for introducing the mixture through the opened top into said reservoir, said mixture defining in said reservoir a bed extending from the diffusion membrane toward the opened top of the reservoir;

means supplying a positive gas flow into the gas manifold, said gas flow passing through the diffusion membrane and the mixture bed and exhausting through the opened top of the reservoir, said mixture bed being fluidized such that the particles of the mixture collect at different levels in the bed in accordance with their density;

means for removing the particles from the reservoir separately; and means for maintaining the reservoir level thereby insuring a uniform depth of fluidized mixture.

11. The apparatus as defined in claim 10, wherein said mounting means comprises spring mounting means.

12. In an apparatus for dry stripping paint from a substrate including means for separating a mixture of particles by at least an air wash, screening and magnetic separation producing thereby a mixture containing a first group of particles of substantially uniform size and density and second group of particles of substantially the same size as the particles of said first group and of a different density than the particles of said first group, the improvement comprising:

means defining a reservoir having a bottom wall, an inlet opening and an outlet opening;

a diffusion membrane coextensive with the bottom wall and spaced therefrom defining a gas manifold with the bottom wall;

mixture supply means for introducing the mixture through the inlet opening in said reservoir, said mixture defining in said reservoir a bed extending from the diffusion membrane toward the outlet opening of said reservoir;

means supplying a positive gas flow into the manifold, said gas passing through the diffusion membrane and the mixture bed and exhausting through the outlet opening, said mixture being fluidized by said gas such that the groups of particles collect at different levels in said bed in accordance with their density; and means for removing the groups of particles from the reservoir separately.

13. The improvement as defined in claim 12, further comprising:

vibration means situated in the reservoir above the diffusion membrane for vibrating the mixture in the fluidized bed reservoir above the diffusion membrane to avoid surging, channeling and the like of the mixture as the particles collect at their different levels.

14. The improvement as defined in claim 12, further comprising:

means for maintaining the reservoir level thereby insuring a uniform depth of fluidized mixture.

15. In an apparatus for dry stripping paint from a substrate utilizing plastic blasting particles including means for separating a mixture of particles by at least an air wash, screening and magnetic separation producing thereby a mixture containing plastic blasting particles of a substantially uniform size and density and particles of substantially the same size and of a different density than the plastic blasting particles, the improvement comprising:

means defining a reservoir having a bottom wall and an opened top;

a diffusion membrane coextensive with the bottom wall and spaced therefrom defining a gas manifold with the bottom wall;

mixture supply means for introducing the mixture after it has been subjected to at least an air wash, screening and magnetic separation, through the opened top into the reservoir, said mixture defining in said reservoir a bed extending from the diffusion membrane toward the opened top of the reservoir;

means supplying a positive gas flow into the gas manifold, said gas passing through the diffusion membrane and the mixture bed and exhausting through the opened end of the reservoir, said mixture bed being fluidized such that the particles of the mixture collect at different levels in the bed in accordance with their density; and mixture removal means for removing the particles of the mixture collected at the different levels in the bed from the reservoir separately.

16. The improvement as defined in claim 15, further comprising:

vibration means situated in the reservoir above the diffusion membrane for vibrating the mixture in the fluidized bed reservoir above the diffusion membrane to avoid surging, channeling and the like of the mixture as the particles collect at their different levels.

17. The improvement as defined in claim 15, further comprising:

means for maintaining the reservoir level thereby insuring a uniform depth of fluidized mixture.

18. In an apparatus for dry stripping paint from a substrate including means for separating a mixture of particles by at least an air wash, screening and magnetic separation producing thereby a mixture containing a first group of particles of substantially uniform size and density and second group of particles of substantially the same size as the particles of said first group and of a different density than the particles of said first group, the improvement comprising:

means defining a reservoir having a bottom wall, an inlet opening and an outlet opening;

a diffusion membrane coextensive with the bottom wall and spaced therefrom defining a gas manifold with the bottom wall;

mixture supply means for introducing the mixture through the inlet opening in said reservoir, said mixture defining in said reservoir a bed extending from the diffusion membrane toward the outlet opening of said reservoir;

means supplying a positive gas flow into the manifold, said gas passing through the diffusion membrane and the mixture bed and exhausting through the outlet opening, said mixture being fluidized by said gas such that the groups of particles collect at different levels in said bed in accordance with their density;

means for removing the groups of particles from the reservoir separately;

spring mounted means on which said means defining the reservoir is mounted permitting vertical displacement of said means defining the reservoir; and level sensing means for sensing a given mixture contamination level as a result of displacement of said means defining the reservoir.

19. In an apparatus for dry stripping paint from a substrate utilizing plastic blasting particles including means for separating a mixture of particles by at least an air wash, screening and magnetic separation producing thereby a mixture containing plastic blasting particles of a substantially uniform size and density and particles of substantially the same size and of a different density than the plastic blasting particles, the improvement comprising:

means defining a reservoir having a bottom wall and an opened top;

a diffusion membrane coextensive with the bottom wall and spaced therefrom defining a gas manifold with the bottom wall;

mixture supply means for introducing the mixture after it has been subjected to at least an air wash, screening and magnetic separation, through the opened top into the reservoir, said mixture defining in said reservoir a bed extending from the diffusion membrane toward the opened top of the reservoir;

means supplying a positive gas flow into the gas manifold, said gas passing through the diffusion membrane and the mixture bed and exhausting through the opened end of the reservoir, said mixture bed being fluidized such that the particles of the mixture collect at different levels in the bed in accordance with their density;

mixture removal means for removing the particles of the mixture collected at the different levels in the bed from the reservoir separately;

mounting means on which said means defining the reservoir is mounted permitting vertical displacement of said means defining the reservoir; and level sensing means for sensing a given mixture contamination level as a result of displacement of said means defining the reservoir.

* * * * *